Sept. 9, 1924.
S. L. SUNDBERG
1,507,630
PULSATOR VALVE
Filed Feb. 6, 1923
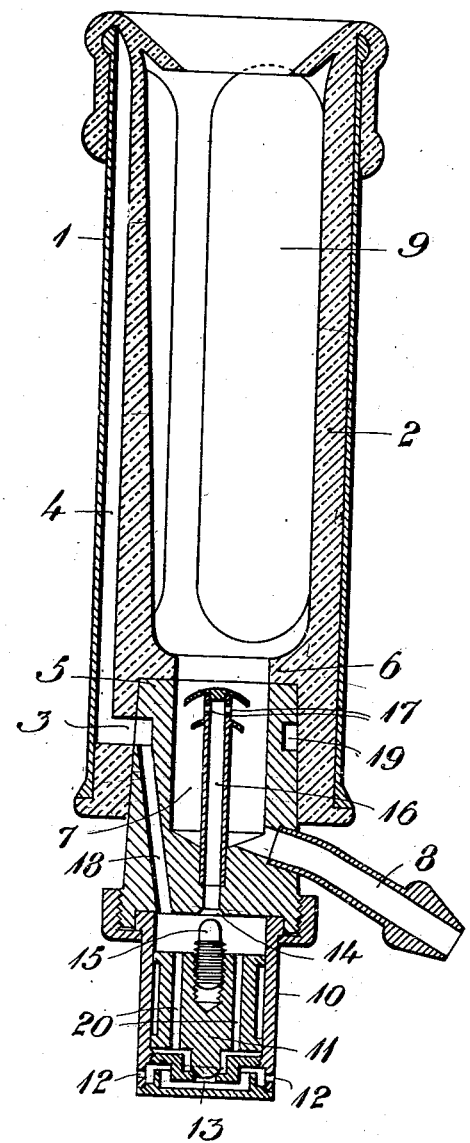
INVENTOR:
BY Sven L. Sundberg
Wm Wallace White
ATTY Patented Sept. 9, 1924.

1,507,630

UNITED STATES PATENT OFFICE.

SVEN LEONARD SUNDBERG, OF STOCKHOLM, SWEDEN.

PULSATOR VALVE.

Application filed February 6, 1923. Serial No. 617,278.

*To all whom it may concern:*

Be it known that I, SVEN LEONARD SUNDBERG, a subject of the King of Sweden, residing at Stockholm, Sweden, have invented new and useful Improvements in Pulsator Valves, of which the following is a specification.

The present invention refers to a pulsator-valve intended for causing pressure variations in a chamber or duct by means of a vacuum and consisting of a valve-member mounted in a valve-casing and adapted to reciprocate between two extreme positions in such a manner that the valve-member with its every stroke closes a valve-opening in its respective extreme positions from the inside of the valve-casing, the reciprocatory movement of which valve-member is brought about by alternately decreasing and increasing the pressure in a pressure variation chamber or duct which is in constant communication with one of the two constantly communicating chambers of the valve-casing on opposite sides of the valve-member, in which connection the valve-member itself controls not only the opening and closing of one of the valve openings, which forms an inlet port to the valve-casing and thus to the pressure variation chamber or duct for a fluid, intended for increase of pressure in this latter, but also the closing of the other valve-opening, which forms a communication port between the vacuum-chamber or duct intended for producing the decrease of pressure, and the said pressure variation chamber or duct. Valves of this kind have previously been suggested for use in milking machines working with a vacuum, but possess certain inconveniences or drawbacks, as will be seen from the following. These inconveniences or drawbacks are done away with by the present invention by reason of the fact that the member, which closes the communication port between the vacuum chamber or duct and the pressure variation chamber or duct, is connected to the valve member in such a manner as to be carried along by the valve member in its movement not only as in the ordinary way towards, but also away from, the said communication port for the purpose that not only the closing but also the opening of the latter may be controlled by the valve-member. The valve according to the present invention, which may be used for many different purposes, is also specially suitable for use in the above mentioned kind of milking-machines.

On the accompanying drawing only by way of example and in vertical section one teat-cup for a milking-machine is shown with a valve constructed according to the invention.

1 is the outer, stiff, tubular wall of the teat-cup and 2 the rubber tube inserted in the same. This has in the form of construction shown at its lower end radial channels 3, which communicate each with one of a plurality of chambers 4 between the wall 1 and the rubber tube 2, which chambers form the above mentioned pressure variation chamber or duct. In the lower end of the rubber tube is inserted a conical plug 5, which rests or presses against a flange 6 in the rubber tube. In the plug 5 there is a chamber 7 from which issues a tube 8 adapted to be connected with the milk-pail (not shown) in which a constant vacuum is maintained. The milk-pail and tube 8 form the aforesaid vacuum-chamber or duct. The teat chamber 9 and the chamber 7 are in constant communication with each other. In the lower end of the plug 5 is fastened the valve here concerned. 10 is the valve-casing and 11 a valve-member reciprocable in the same, between an upper and a lower extreme position. 12 are inlet openings to the valve casing communicating with the atmosphere and 13 a valve-seat for the lower mushroom-shaped portion of the valve-member said valve-seat communicating with the inlets 12. 14 is an upper valve-seat in the plug 5 for a mushroom-shaped member in the form of a stud 15 screwed into the valve-member. The valve-seat 14 is, by means of a tube 16 and holes 17, in communication with the chamber 7. Furthermore, the valve-casing 10 is, through a channel 18 and an annular groove 19 in the plug 5, in constant communication with the chambers 4. Finally, the chambers above and below the valve-member are in constant communication with each other by means of channels 20 in the valve-member suitably proportioned to their area, and through the play or lost motion between the valve-member and the inner wall of the valve-casing. As will be seen the area of the valve-seat 13 is greater than that of the valve-seat 14. The stroke of the valve-member may be adjustable through the length of the valve-member reckoned between the extreme positions, or the distance between the extreme positions, or both being adjustable. In the example shown the stroke of the valve-member is adjustable by the length of the valve-member between the valve-seats being adjustable through screwing the stud 15 further into or out of the valve-member.

The form of construction shown operates in the following manner: The teat is inserted into the teat-chamber 9 and the tube 8 connected up with the milk-pail, in which a vacuum of, say 350 mm. is kept up. A vacuum is thus also caused in the chamber 7, the teat-chamber 9, and, when the valve-member is in its lower position, also in the valve-casing 10 and the chambers 4. On account of the vacuum in the position shown in the drawing being equal on both sides of the rubber tube, the same occupies the position shown in the drawing. Owing to the fact that the area of the valve-seat 13 and the weight of the valve-member are specially balanced with regard to the size of the vacuum, the outside air forces up the valve-member to its upper valve-seat 14. When this has been closed by the stud 15, the chambers 4 are shut off from the vacuum, and the outside atmospheric pressure commences to make itself felt in them while a vacuum continues to exist in the teat-chamber 9. This causes the rubber tube to be pressed in towards the teat. But shortly after, the valve-member by means of its weight and on account of the size of the area of the valve-seat 14 in regards to the vacuum, can return to its lower extreme position, after which the valve-member again moves upwards, as previously described, and thus reciprocates between its extreme positions, as long as the vacuum is kept up in the teat-chamber 9. By this means an even and reliable pulsating movement for acting upon the teat is imparted to the rubber tube.

In the case of the previously mentioned, known valve, called ball-pulsator, the opening of the communication port between the vacuum-chamber and the pressure-variation chambers is not controlled by the valve-member. For this reason it may happen that the ball-valve member which shuts the last mentioned port, locks itself to the same so that the valve must be taken to pieces and put in order again. Besides, it may happen that the machine works with a higher vacuum than permissible without this being discovered, and the teat or udder may thus easily be damaged or hurt. These drawbacks are completely removed by the present invention. If, for example the vacuum in the present invention for some cause or other should exceed a certain limit, the valve remains in its upper position and the action upon the teat ceases so that the defect is easily discovered and must be remedied before milking can proceed. By the channels 20 being properly balanced or dimensioned in relation to their area, which may be adjustable (not shown), the valve-member can be given a speed properly adapted for acting upon the teat.

Clearly the separate parts of the form of construction shown may be varied in many ways, provided only the characteristics of the invention be retained. For example the useful force of gravitation of the valve-member may be replaced by some other force, for instance a spring or the force of another similar pulsator-valve, the valve-member of which is connected to the other valve-member in such a manner that both valve-members cooperate with each other but move in opposite directions to each other.

What I claim is:

1. A device of the class described, comprising, in combination, a double-walled vessel having a variable pressure chamber between its walls, a valve casing in communication with said chamber and with the interior of the vessel, said valve casing being provided with an air-inlet port of greater diameter than that of its communication with the vessel, a reciprocatory valve member in said casing adapted alternately to close said port and said communication with the vessel, said valve being provided with a plurality of channels communicating with said variable pressure chamber and said air-inlet port, and means for placing said vessel in communication with a vacuum producing machine.

2. A device of the class described, comprising, in combination, a double-walled vessel having a plurality of channels forming a variable pressure chamber between its walls, a valve casing in communication with said channels and with the interior of the vessel, said valve casing being provided with an air-inlet port of greater diameter than that of its communication with the vessel, a reciprocatory valve member in said casing adapted to alternately close said port and said communication with the vessel, means for adjusting the limits of reciprocation of said valve member, said valve member being provided with a plurality of channels in communication with said variable pressure chamber and said air-inlet port, and means for placing said vessel in communication with a vacuum producing device.

3. A device of the class described, comprising, in combination, a double-walled vessel having a variable pressure chamber between its walls, a valve casing in communication with said chamber and with the interior of the vessel, said valve casing being provided with an air-inlet port, a reciprocatory valve member in said casing adapted alternately to close said port and said communication with the vessel, said valve being provided with a plurality of channels communicating with said variable pressure chamber and said air-inlet port, and means for placing said vessel in communication with a vacuum producing device, the area of the inlet port and the weight of the valve member being so proportioned to the amount of vacuum that the valve member is moved in one direction by atmospheric pressure and in the opposite direction by gravity.

In testimony whereof I have signed my name to this specification.

SVEN LEONARD SUNDBERG.